(12) United States Patent
Tanaka et al.

(10) Patent No.: US 10,578,774 B2
(45) Date of Patent: Mar. 3, 2020

(54) RETARDATION-INCREASING AGENT, CELLULOSE-BASED RESIN COMPOSITION USING SAME, AND FILM

(71) Applicant: ADEKA CORPORATION, Tokyo (JP)

(72) Inventors: Yuki Tanaka, Saitama (JP); Takashi Murakami, Saitama (JP); Masaki Segawa, Saitama (JP); Koichiro Abe, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 88 days.

(21) Appl. No.: 15/654,215

(22) Filed: Jul. 19, 2017

(65) Prior Publication Data
US 2017/0315268 A1 Nov. 2, 2017

Related U.S. Application Data

(62) Division of application No. 15/033,364, filed as application No. PCT/JP2014/077012 on Oct. 8, 2014, now abandoned.

(30) Foreign Application Priority Data

Oct. 30, 2013 (JP) .................................. 2013-225801
Jul. 31, 2014 (JP) .................................. 2014-155723

(51) Int. Cl.
| C08K 5/103 | (2006.01) |
| G02B 1/08 | (2006.01) |
| G02B 5/30 | (2006.01) |
| C08L 1/10 | (2006.01) |
| C08L 1/12 | (2006.01) |
| C08K 5/10 | (2006.01) |
| C08K 5/315 | (2006.01) |
| C08J 5/18 | (2006.01) |
| C08K 5/11 | (2006.01) |

(Continued)

(52) U.S. Cl.
CPC ................. *G02B 1/08* (2013.01); *C08J 5/18* (2013.01); *C08K 5/01* (2013.01); *C08K 5/10* (2013.01); *C08K 5/11* (2013.01); *C08K 5/12* (2013.01); *C08K 5/315* (2013.01); *C08L 1/10* (2013.01); *C08L 1/12* (2013.01); *G02B 5/305* (2013.01); *G02B 5/3083* (2013.01); *G02F 1/13363* (2013.01); *C08J 2301/12* (2013.01); *G02F 2413/11* (2013.01)

(58) Field of Classification Search
None
See application file for complete search history.

(56) References Cited

U.S. PATENT DOCUMENTS 7,166,339 B1 1/2007 Mori et al.
2008/0165312 A1* 7/2008 Sakurazawa ............ B29C 41/28
349/117

(Continued)

FOREIGN PATENT DOCUMENTS

JP 11-80090 A 3/1999
JP 2000-273205 A 10/2000

(Continued)

OTHER PUBLICATIONS

Japanese Office Action for Application No. 2014-155723, dated Dec. 4, 2018.

(Continued)

*Primary Examiner* — Yun Qian
(74) *Attorney, Agent, or Firm* — Birch, Stewart, Kolasch & Birch, LLP

(57) ABSTRACT

Provided are: a retardation-increasing agent that has excellent compatibility and, when incorporated into a resin film, is capable of not only adjusting the thickness-direction phase difference toward a positive direction but also imparting the film with high retardation; a cellulose-based resin composition comprising the retardation-increasing agent; and a film that is obtained from the cellulose-based resin composition and has excellent optical properties. The retardation-increasing agent comprises a compound represented by the following Formula (1) or (2):

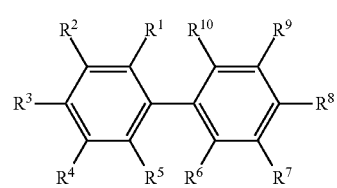

(1)

(wherein, $R^1$ to $R^{10}$ each independently represent a hydrogen atom or the like); or

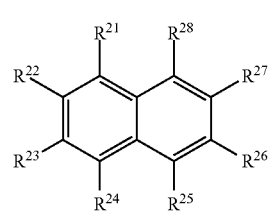
(2)

(wherein, $R^{21}$ to $R^{28}$ each independently represent a hydrogen atom or the like).

4 Claims, No Drawings

(51) Int. Cl.
*C08K 5/12* (2006.01)
*G02F 1/13363* (2006.01)
*C08K 5/01* (2006.01)

(56) References Cited

U.S. PATENT DOCUMENTS

| | | |
|---|---|---|
| 2010/0245744 A1 | 9/2010 | Yoshida et al. |
| 2015/0085217 A1* | 3/2015 | Nanjo .................. G02B 5/3083 349/42 |

FOREIGN PATENT DOCUMENTS

| | | |
|---|---|---|
| JP | 2005-247943 A | 9/2005 |
| JP | 2006-317813 A | 11/2006 |
| JP | 2008-89855 A | 4/2008 |
| JP | 2008-89860 A | 4/2008 |
| JP | 2008-144126 A | 6/2008 |
| JP | 2010-254949 A | 11/2010 |
| JP | 2013-200516 A | 10/2013 |
| WO | WO 00/65384 A1 | 11/2000 |
| WO | WO 2010/001780 A1 | 1/2010 |
| WO | WO 2013164868 * | 11/2013 |

OTHER PUBLICATIONS

International Search Report, issued in PCT/JP2014/077012, dated Jan. 13, 2015.
Written Opinion of the International Searching Authority, issued in PCT/JP2014/077012, dated Jan. 13, 2015.

* cited by examiner

RETARDATION-INCREASING AGENT, CELLULOSE-BASED RESIN COMPOSITION USING SAME, AND FILM

CROSS-REFERENCE TO RELATED APPLICATIONS

This application is a Divisional of copending application Ser. No. 15/033,364, filed on Apr. 29, 2016, which is the National Phase under 35 U.S.C. § 371 of International Application No. PCT/JP2014/077012, filed on Oct. 8, 2014, which claims the benefit under 35 U.S.C. § 119(a) to Patent Application No. 2013-225801, filed in JAPAN on Oct. 30, 2013, and to Patent Application No. 2014-155723, filed in JAPAN on Jul. 31, 2014, all of which are hereby expressly incorporated by reference into the present application.

TECHNICAL FIELD

The present invention relates to: a retardation-increasing agent; a cellulose-based resin composition comprising the same; and a film. More particularly, the present invention relates to: a retardation-increasing agent to be used in optical films; a cellulose-based resin composition comprising the same; and a film obtained from the cellulose-based resin composition.

BACKGROUND ART

Liquid crystal displays have a structure in which a polarizing film is arranged on both sides of a liquid crystal cell and, in addition to the polarizing films, a variety of optical films such as a phase difference film, a viewing angle expansion film and a brightness-improving film are also used in liquid crystal panels.

Conventionally, cellulose-based resins have been widely used as optical films from the standpoints of their lamination with polyvinyl alcohols used for polarizing films, transparency, toughness and the like.

In recent years, due to accelerated reductions in the thickness and weight of televisions and laptop computers, there is a demand for further thickness reduction and multifunctionalization of optical films as well. However, cellulose-based resin films themselves do not have sufficient retardation (birefringence or optical properties) essential for optical films; therefore, various methods for imparting retardation to a cellulose-based resin film have been examined.

For example, a method of adding a retardation-increasing agent is known; however, when an optical film is reduced in thickness, since the retardation value is dependent on the thickness, in order to allow a conventional retardation-increasing agent to exhibit its performance, the retardation-increasing agent is required to be added in a large amount. This causes problems that, for example, the retardation-increasing agent bleeds out from the film surface and a non-uniform film is consequently produced; therefore, it is extremely difficult to prevent deterioration of the working efficiency and productivity and to satisfy diverse performance requirements that conform to such thickness reduction. Furthermore, although methods of reducing the total acyl group substitution degree of a cellulose resin and the like have been proposed, these methods are not satisfactory from the practical standpoint because they present new problems such as an increase in moisture absorption.

Under these circumstances, there have been recently proposed methods of adding a specific retardation-increasing agent for practical use. For instance, Patent Document 1 proposes a phase difference plate which is composed of a cellulose ester film that contains a retardation-improving agent comprising a compound having a 1,3,5-triazine ring. Further, in Patent Document 2, a carbamic acid ester compound is proposed as a retardation-controlling agent.

RELATED ART DOCUMENTS

Patent Documents

Patent Document 1: WO 00/065384
Patent Document 2: Japanese Unexamined Patent Application Publication No. 2006-317813

SUMMARY OF THE INVENTION

Problems to be Solved by the Invention

However, the cellulose ester film proposed in Patent Document 1 that contains a retardation-improving agent comprising a compound having a 1,3,5-triazine ring does not have sufficient compatibility and the retardation-improving effect thereof is thus not satisfactory. Further, the use of a carbamic acid ester compound as a retardation-controlling agent in Patent Document 2 is for adjustment of the thickness-direction phase difference of a coating film for optical compensation toward a negative direction.

In view of the above, an object of the present invention is to provide a retardation-increasing agent that has excellent compatibility and, when incorporated into a cellulose-based resin, is capable of not only adjusting the thickness-direction phase difference toward a positive direction but also imparting the resin with high retardation.

Another object of the present invention is to provide a cellulose-based resin composition comprising the retardation-increasing agent. Yet another object of the present invention is to provide a film which is obtained from the cellulose-based resin composition and exhibits excellent optical properties.

Means for Solving the Problems

The present inventors intensively studied so as to solve the above-described problems and discovered that the above-described objects can be achieved by using a specific compound as a retardation-increasing agent, thereby completing the present invention.

That is, the retardation-increasing agent of the present invention comprises a compound represented by the following Formula (1) or (2):

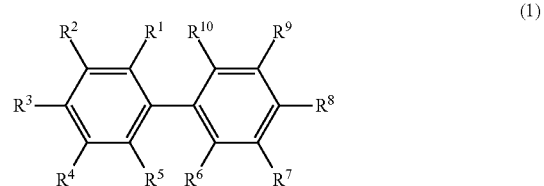

(1)

[wherein, $R^1$ to $R^{10}$ each independently represent a hydrogen atom; a halogen atom; a hydroxy group; a cyano group; a nitro group; an amino group; a substituted or unsubstituted alkyl group having 1 to 10 carbon atoms; a substituted or unsubstituted alkenyl group having 2 to 12 carbon atoms; a substituted or unsubstituted cycloalkyl group having 3 to 12 carbon atoms; a group represented by $R^A(C=O)OR^B$— (wherein $R^A$ represents an alkyl group having 1 to 10 carbon atoms, an alkenyl group having 2 to 12 carbon atoms or a cycloalkyl group having 3 to 12 carbon atoms, and $R^B$ represents a single bond or an alkylene group having 1 to 10 carbon atoms, which alkyl group, alkenyl group and alkylene group are optionally interrupted by an oxygen atom); or $R^AO(C=O)R^B$— (wherein, $R^A$ and $R^B$ each represent the same group as described above), which alkyl group, alkenyl group and cycloalkyl group are optionally interrupted by one or plural oxygen atoms, carbonyl groups, carboxy groups or amino groups]; or

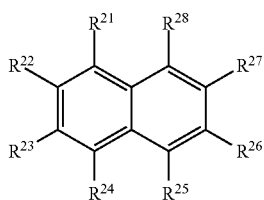

(2)

[wherein, $R^{21}$ to $R^{28}$ each independently represent a hydrogen atom; a halogen atom; a hydroxy group; a cyano group; a nitro group; an amino group; a substituted or unsubstituted alkyl group having 1 to 10 carbon atoms; a substituted or unsubstituted alkenyl group having 2 to 12 carbon atoms; a substituted or unsubstituted cycloalkyl group having 3 to 12 carbon atoms; a group represented by $R^A(C=O)OR^B$— (wherein $R^A$ represents an alkyl group having 1 to 10 carbon atoms, an alkenyl group having 2 to 12 carbon atoms or a cycloalkyl group having 3 to 12 carbon atoms, and $R^B$ represents a single bond or an alkylene group having 1 to 10 carbon atoms, which alkyl group, alkenyl group and alkylene group are optionally interrupted by an oxygen atom); or $R^AO(C=O)R^B$— (wherein, $R^A$ and $R^B$ each represent the same group as described above), which alkyl group, alkenyl group and cycloalkyl group are optionally interrupted by one or plural oxygen atoms, carbonyl groups, carboxy groups or amino groups].

In the retardation-increasing agent of the present invention, it is preferred that the $R^1$, $R^2$, $R^4$, $R^5$, $R^6$, $R^9$ and $R^{10}$ in the Formula (1) be hydrogen atoms. Further, it is preferred that at least one of the $R^3$ and $R^8$ in the Formula (1) be selected from the group consisting of a cyano group, an alkyl group having 1 to 10 carbon atoms, an alkenyl group having 2 to 12 carbon atoms and a cycloalkyl group having 3 to 12 carbon atoms, which alkyl group, alkenyl group and cycloalkyl group are optionally interrupted by one or plural oxygen atoms, carbonyl groups or amino groups, and it is particularly preferred that the compound represented by the Formula (1) be a compound represented by the following Formula (3):

alkyl group having 1 to 10 carbon atoms or a substituted or unsubstituted cycloalkyl group having 4 to 10 carbon atoms, which alkyl group is optionally interrupted by one or plural oxygen atoms or carbonyl groups).

Further, in the retardation-increasing agent of the present invention, it is preferred that the $R^{21}$, $R^{23}$, $R^{24}$, $R^{25}$, $R^{27}$ and $R^{28}$ in the Formula (2) be hydrogen atoms; and that at least one of the $R^{22}$ and $R^{26}$ in the Formula (2) be selected from the group consisting of a cyano group, an alkyl group having 1 to 10 carbon atoms, an alkenyl group having 2 to 12 carbon atoms and a cycloalkyl group having 3 to 12 carbon atoms, which alkyl group, alkenyl group and cycloalkyl group are optionally interrupted by one or plural oxygen atoms, carbonyl groups or amino groups.

The cellulose-based resin composition of the present invention is characterized by comprising the retardation-increasing agent of the present invention in an amount of 0.1 to 30 parts by mass with respect to 100 parts by mass of a cellulose-based resin.

It is preferred that the cellulose-based resin composition of the present invention comprise a plasticizer in an amount of 1 to 30 parts by mass with respect to 100 parts by mass of the cellulose-based resin. Further, in the cellulose-based resin composition of the present invention, it is preferred that the cellulose-based resin be cellulose acylate.

The film of the present invention is obtained by molding the cellulose-based resin composition of the present invention.

It is noted here that the phrase "excellent optical properties" used in the present invention means that a high retardation value is imparted to the film, and the retardation can be generally determined based on the retardation value (Rth) in the film thickness direction.

The retardation value (Rth) is defined by the following equation:

$$Rth=\{(nx+ny)/2-nz\}\times d$$

[wherein, nx represents the refractive index in the direction with the highest film in-plane refractive index; ny represents the film in-plane refractive index in the direction perpendicular to the direction of nx; nz represents the refractive index in the film thickness direction; and d represents the film thickness (nm)].

The retardation value (Rth) can be measured using, for example, an automatic birefringence meter such as KOBRA-WR (manufactured by Oji Scientific Instruments Co., Ltd.) or RETS-100 (manufactured by Otsuka Electronics Co., Ltd.).

Effects of the Invention

According to the present invention, a film suitably used as a phase difference film for liquid crystal displays, particu- (3)

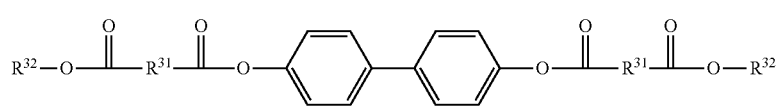

(wherein, $R^{31}$ represents a substituted or unsubstituted alkylene group having 1 to 10 carbon atoms or a substituted or unsubstituted cycloalkylene group having 4 to 10 carbon atoms; and $R^{32}$ represents a substituted or unsubstituted larly VA-mode (vertical alignment mode) liquid crystal displays comprising a VA-mode liquid crystal cell, which film has excellent optical properties, in other words, imparted with high retardation, is provided.

MODE FOR CARRYING OUT THE INVENTION

The present invention will now be described in detail.
The retardation-increasing agent of the present invention comprises a compound represented by the following Formula (1) or (2):

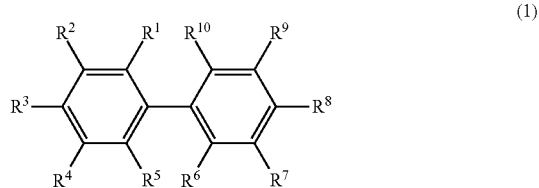

(1)

[wherein, $R^1$ to $R^{10}$ each independently represent a hydrogen atom; a halogen atom; a hydroxy group; a cyano group; a nitro group; an amino group; a substituted or unsubstituted alkyl group having 1 to 10 carbon atoms; a substituted or unsubstituted alkenyl group having 2 to 12 carbon atoms; a substituted or unsubstituted cycloalkyl group having 3 to 12 carbon atoms; a group represented by $R^A(C=O)OR^B-$ (wherein $R^A$ represents an alkyl group having 1 to 10 carbon atoms, an alkenyl group having 2 to 12 carbon atoms or a cycloalkyl group having 3 to 12 carbon atoms, and $R^B$ represents a single bond or an alkylene group having 1 to 10 carbon atoms, which alkyl group, alkenyl group and alkylene group are optionally interrupted by an oxygen atom); or $R^AO(C=O)R^B-$ (wherein, $R^A$ and $R^B$ each represent the same group as described above), which alkyl group, alkenyl group and cycloalkyl group are optionally interrupted by one or plural oxygen atoms, carbonyl groups, carboxy groups or amino groups]; or

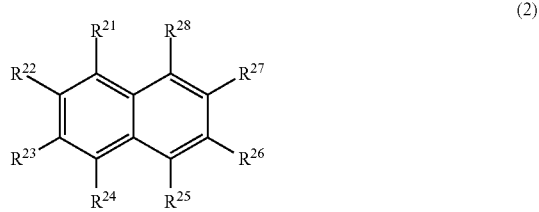

(2)

[wherein, $R^{21}$ to $R^{28}$ each independently represent a hydrogen atom; a halogen atom; a hydroxy group; a cyano group; a nitro group; an amino group; a substituted or unsubstituted alkyl group having 1 to 10 carbon atoms; a substituted or unsubstituted alkenyl group having 2 to 12 carbon atoms; a substituted or unsubstituted cycloalkyl group having 3 to 12 carbon atoms; a group represented by $R^A(C=O)OR^B-$ (wherein $R^A$ represents an alkyl group having 1 to 10 carbon atoms, an alkenyl group having 2 to 12 carbon atoms or a cycloalkyl group having 3 to 12 carbon atoms, and $R^B$ represents a single bond or an alkylene group having 1 to 10 carbon atoms, which alkyl group, alkenyl group and alkylene group are optionally interrupted by an oxygen atom); or $R^AO(C=O)R^B-$ (wherein, $R^A$ and $R^B$ each represent the same group as described above), which alkyl group, alkenyl group and cycloalkyl group are optionally interrupted by one or plural oxygen atoms, carbonyl groups, carboxy groups or amino groups].

Examples of the halogen atom that may be represented by the $R^1$ to $R^{10}$ of the Formula (1) and the $R^{21}$ to $R^{28}$ of the Formula (2) include fluorine, chlorine, bromine and iodine.

Examples of the substituted or unsubstituted alkyl group having 1 to 10 carbon atoms that may be represented by the $R^1$ to $R^{10}$ of the Formula (1) and the $R^{21}$ to $R^{28}$ of the Formula (2) include methyl, ethyl, propyl, isopropyl, butyl, isobutyl, sec-butyl, tert-butyl, amyl, isoamyl, hexyl, isohexyl, heptyl, octyl, isooctyl, tert-octyl, 2-ethylhexyl, nonyl, isononyl and decyl. Examples of a branched alkyl group include the above-described alkyl groups which are substituted with one or more alkyl groups having 1 to 4 carbon atoms. Thereamong, alkyl groups having 1 to 9 carbon atoms are preferred, and alkyl groups having 1 to 8 carbon atoms are more preferred.

Further, examples of the substituted or unsubstituted alkenyl group having 2 to 12 carbon atoms that may be represented by the $R^1$ to $R^{10}$ of the Formula (1) and the $R^{21}$ to $R^{28}$ of the Formula (2) include ethenyl, propenyl, butenyl, pentenyl, hexenyl, heptenyl, octenyl, nonenyl, decenyl, undecenyl and dodecenyl as well as alkadienyl groups and alkatrienyl groups. Thereamong, ethenyl, propenyl, butenyl, pentenyl, hexenyl, heptenyl and octenyl are preferred.

Still further, examples of the substituted or unsubstituted cycloalkyl group having 3 to 12 carbon atoms that may be represented by the $R^1$ to $R^{10}$ of the Formula (1) and the $R^{21}$ to $R^{28}$ of the Formula (2) include cyclopropyl, cyclobutyl, cyclohexyl, cycloheptyl, cyclooctyl, methylcyclohexyl, ethylcyclohexyl and butylcyclohexyl. Thereamong, cyclohexyl, cycloheptyl and cyclooctyl are preferred, and cyclohexyl and cyclooctyl are more preferred.

The above-described alkyl groups, alkenyl groups and cycloalkyl groups are optionally interrupted by one or plural oxygen atoms, carbonyl groups, carboxy groups or amino groups. Examples of a substituent in the substituted alkyl group, substituted alkenyl group and substituted cycloalkyl group include a halogen atom, a hydroxy group, a cyano group, a nitro group and a carbonyl group.

Examples of the alkyl group, alkenyl group and cycloalkyl group that may be represented by the R' to $R^{10}$ of the Formula (1) and the $R^A$ and $R^B$ of the $R^{21}$ to $R^{28}$ of the Formula (2) include the same ones as those exemplified above. Examples of the alkylene group include those alkylene groups that correspond to the above-described alkyl groups.

Further, preferably at least one, more preferably 2 to 10, still more preferably 2 to 8 of the $R^1$ to $R^{10}$ of the Formula (1) and the $R^{21}$ to $R^{28}$ of the Formula (2) be a group other than a hydrogen atom. Suitably, the $R^1$, $R^2$, $R^4$, $R^5$, $R^6$, $R^7$, $R^9$ and $R^{10}$ in the Formula (1) are hydrogen atoms and the $R^{21}$, $R^{23}$, $R^{24}$, $R^{25}$, $R^{27}$ and $R^{28}$ in the Formula (2) are hydrogen atoms. It is particularly preferred that at least one of the $R^3$ and $R^8$ of the Formula (1) or at least one of the $R^{22}$ and $R^{26}$ of the Formula (2) be a hydroxy group; a cyano group; an alkyl group having 1 to 10 carbon atoms; an alkyl group having 1 to 10 carbon atoms that is interrupted by one or plural oxygen atoms or carbonyl groups; an alkenyl group having 2 to 12 carbon atoms; an alkenyl group having 2 to 12 carbon atoms that is interrupted by one or plural oxygen atoms or carbonyl groups; or a cycloalkyl group having 3 to 12 carbon atoms.

The present invention is a retardation-increasing agent comprising a compound represented by the Formula (1) or (2). Particularly, a compound represented by the Formula (1) is preferred and, especially, a compound represented by the following Formula (3) is excellent as a retardation-increasing agent:

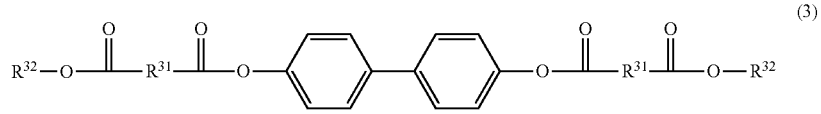

(wherein, $R^{31}$ represents a substituted or unsubstituted alkylene group having 1 to 10 carbon atoms or a substituted or unsubstituted cycloalkylene group having 4 to 10 carbon atoms; and $R^{32}$ represents a substituted or unsubstituted alkyl group having 1 to 10 carbon atoms or a substituted or unsubstituted cycloalkyl group having 4 to 10 carbon atoms, which alkyl group is optionally interrupted by one or plural oxygen atoms or carbonyl groups).

The substituted or unsubstituted alkylene group having 1 to 10 carbon atoms that may be represented by the $R^{31}$ of the Formula (3) include alkylene groups that are obtained by removing one hydrogen atom from the substituted or unsubstituted alkyl groups exemplified for the Formula (1). Thereamong, alkylene groups having 1 to 8 carbon atoms are preferred, and alkylene groups having 2, 4 or 8 carbon atoms are most preferred.

Examples of the substituted or unsubstituted cycloalkylene group having 4 to 10 carbon atoms that may be represented by the $R^{31}$ of the Formula (3) include cycloalkylene groups that are obtained by removing one hydrogen atom from cyclobutyl, cyclohexyl, cycloheptyl, cyclooctyl, methylcyclohexyl, ethylcyclohexyl, butylcyclohexyl or the like. Thereamong, cycloalkylene groups that are obtained by removing one hydrogen atom from cyclohexyl, cycloheptyl or cyclooctyl are preferred, and cycloalkylene groups that are obtained by removing one hydrogen atom from cyclohexyl or cyclooctyl are most preferred.

Examples of the substituted or unsubstituted alkyl group having 1 to 10 carbon atoms that may be represented by the $R^{32}$ of the Formula (3) include the same substituted or unsubstituted alkyl groups as those exemplified for the Formula (1). Thereamong, from the standpoint of obtaining a favorable retardation (Rth) value, alkyl groups having 1 to 9 carbon atoms are preferred, alkyl groups having 1 to 8 carbon atoms are more preferred, alkyl groups having 1 to 4 carbon atoms are still more preferred, alkyl groups having 2 to 4 carbon atoms are yet still more preferred, and alkyl groups having 1 or 2 carbon atoms are most preferred.

Examples of the substituted or unsubstituted cycloalkyl group having 4 to 10 carbon atoms that may be represented by the $R^{32}$ of the Formula (3) include the same substituted or unsubstituted cycloalkyl groups as those exemplified for the Formula (1). Thereamong, cyclohexyl, cycloheptyl and cyclooctyl are preferred, and cyclohexyl and cyclooctyl are most preferred.

The above-described alkyl group and cycloalkyl group are optionally interrupted by one or plural oxygen atoms or carbonyl groups.

Specific examples of the retardation-increasing agent used in the present invention are shown below; however, the present invention is not restricted thereto.

Compound No. 1-1

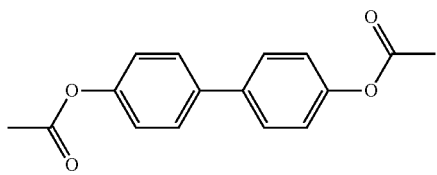

Compound No. 1-2

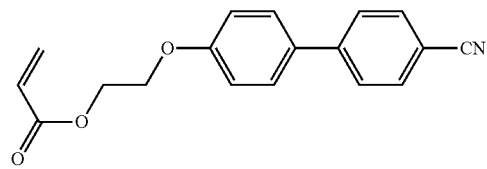

Compound No. 1-3

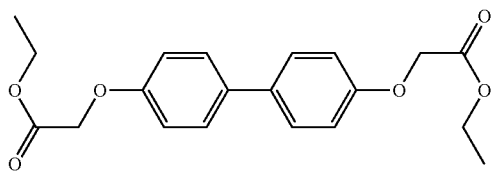

Compound No. 1-4

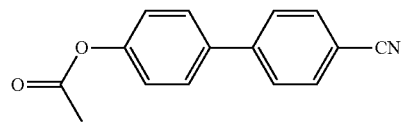

Compound No. 1-5

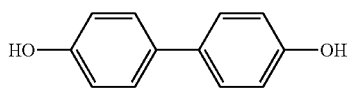

Compound No. 1-6

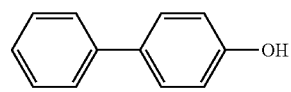

Compound No. 1-7

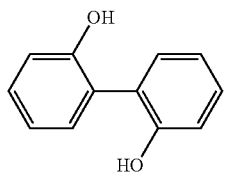

Compound No. 1-8

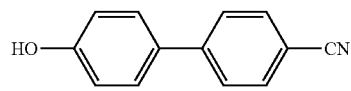

-continued
Compound No. 1-9
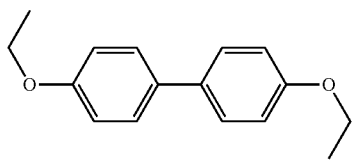
Compound No. 1-10
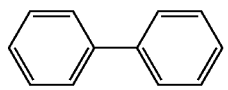
Compound No. 1-11
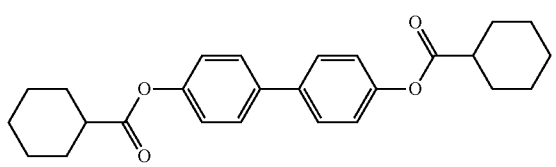
Compound No. 1-12
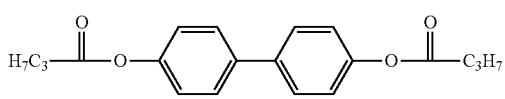
Compound No. 1-13
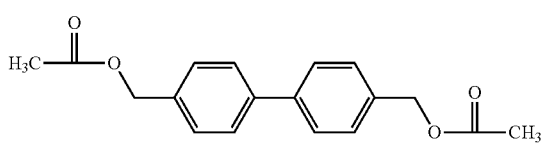
Compound No. 1-14
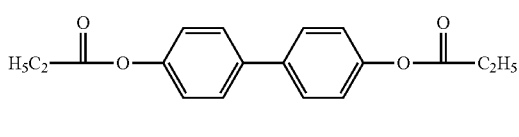
Compound No. 1-15
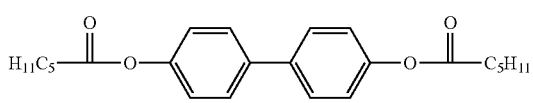
Compound No. 1-16
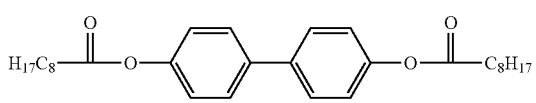
Compound No. 1-17
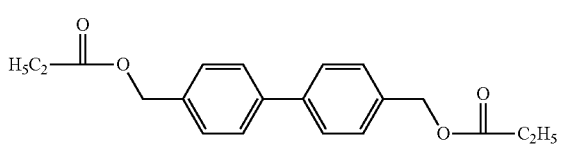
Compound No. 1-18
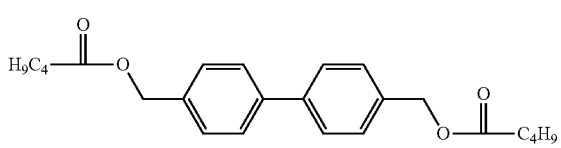
Compound No. 1-19
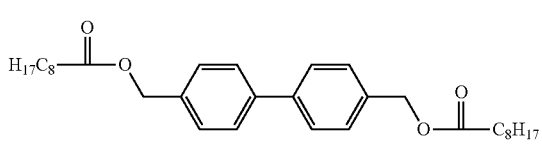
Compound No. 1-20
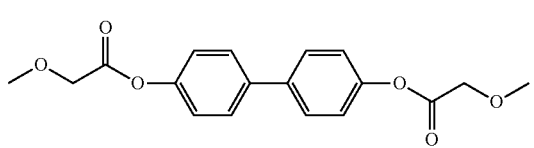
Compound No. 1-21
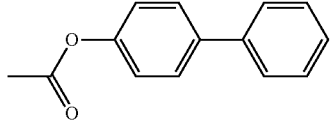
Compound No. 1-22
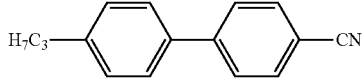
Compound No. 2-1
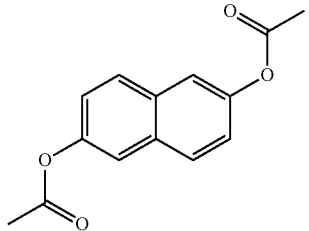
Compound No. 2-2
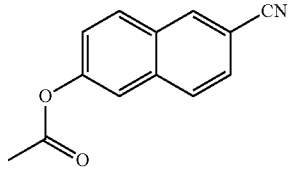

-continued
Compound No. 2-3
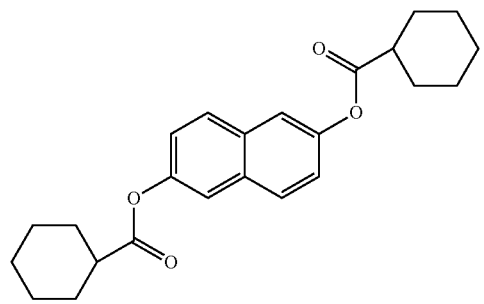
Compound No. 3-1
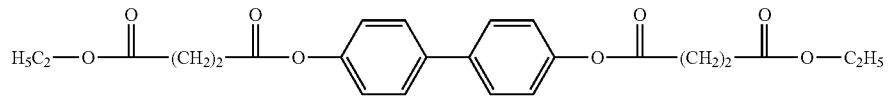
Compound No. 3-2
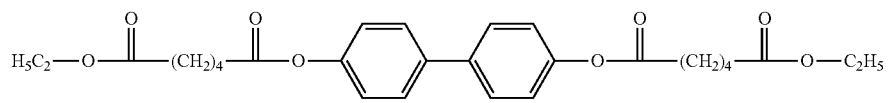
Compound No. 3-3
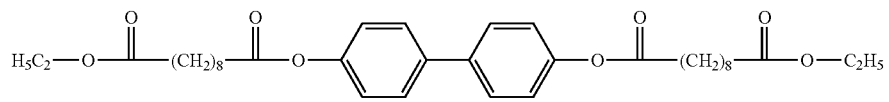
Compound No. 3-4
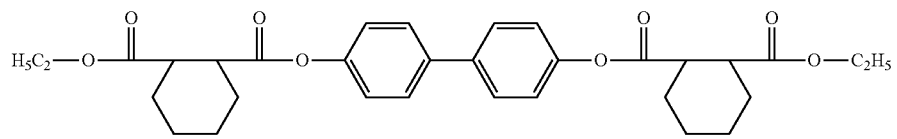
Compound No. 3-5
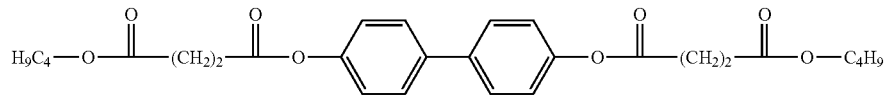
Compound No. 3-6
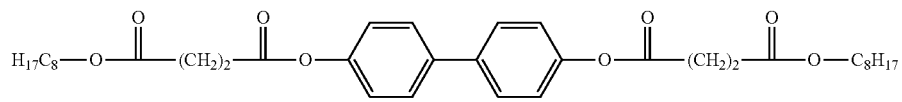
Compound No. 3-7
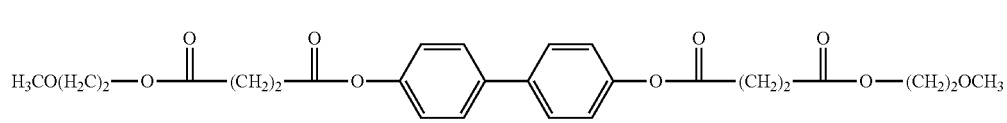
Compound No. 3-8
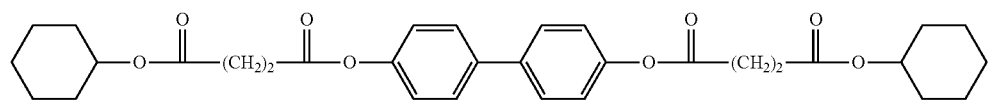
Compound No. 3-9
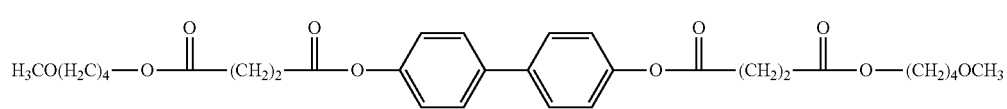
Compound No. 3-10
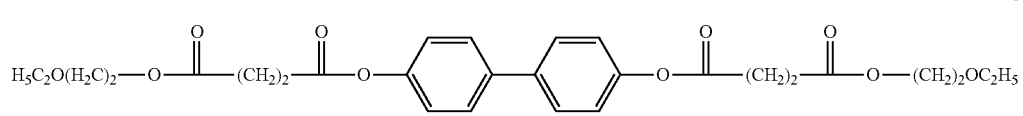
Compound No. 3-11
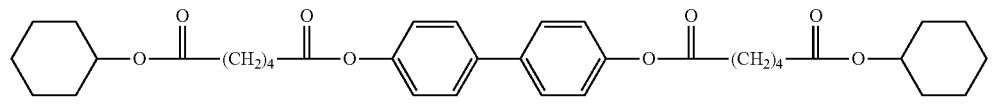

Compound No. 3-12

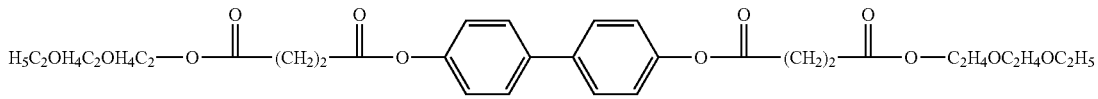

The retardation-increasing agent of the present invention can be suitably used for a cellulose-based resin film. In this case, the above-described compounds may be used individually, or two or more thereof may be used as a mixture.

Next, the cellulose-based resin composition of the present invention will be described. The cellulose-based resin composition of the present invention comprises the above-described retardation-increasing agent of the present invention in an amount of 0.1 to 30 parts by mass with respect to 100 parts by mass of a cellulose-based resin.

The cellulose-based resin used in the present invention may be of any kind; however, it is preferably a fatty acid ester of cellulose (cellulose acylate), more preferably a lower fatty acid ester of cellulose. The term "lower fatty acid" in the lower fatty acid ester of cellulose means a fatty acid having 6 or less carbon atoms. Examples of such a lower fatty acid ester of cellulose include cellulose acetate, cellulose propionate and cellulose butyrate, as well as mixed fatty acid esters such as cellulose acetate propionate and cellulose acetate butyrate that are described in, for example, Japanese Unexamined Patent Application Publication Nos. 1110-45804 and H8-231761 and U.S. Pat. No. 2,319,052 (Specification).

In cases where the retardation-increasing agent of the present invention is used in a cellulose-based resin, the amount thereof is preferably 0.1 to 30 parts by mass, more preferably 1 to 20 parts by mass, with respect to 100 parts by mass of the cellulose-based resin. When this amount is less than 0.1 parts by mass, the effect of the retardation-increasing agent is not sufficiently exerted, whereas when the retardation-increasing agent is used in an amount greater than 30 parts by mass, bleeding thereof may occur, which is not preferred.

In the cellulose-based resin composition of the present invention, a plasticizer may be used arbitrarily. The plasticizer is not particularly restricted as long as it is known to be used in a cellulose-based resin composition. Examples of such a plasticizer include phthalate-based plasticizers such as dibutyl phthalate, butylhexyl phthalate, diheptyl phthalate, dioctyl phthalate, diisononyl phthalate, diisodecyl phthalate, dilauryl phthalate, dicyclohexyl phthalate and dioctyl terephthalate; adipate-based plasticizers such as dioctyl adipate, diisononyl adipate, diisodecyl adipate and di(butyldiglycol)adipate; phosphate-based plasticizers such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate, octyldiphenyl phosphate and biphenyldiphenyl phosphate; polyester-based plasticizers in which ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, neopentyl glycol or the like is used as a polyhydric alcohol, oxalic acid, malonic acid, succinic acid, glutaric acid, adipic acid, pimelic acid, suberic acid, azelaic acid, sebacic acid, phthalic acid, isophthalic acid, terephthalic acid or the like is used as a dibasic acid and, as required, a monohydric alcohol and a monocarboxylic acid (e.g., acetic acid or an aromatic acid) are used as stoppers.

The plasticizer is used in an amount of preferably 1 to 30 parts by mass, more preferably 1 to 20 parts by mass, with respect to 100 parts by mass of the cellulose-based resin. When this amount is less than 1 part by mass, the effect of the plasticizer is not sufficiently exerted, whereas when the plasticizer is used in an amount greater than 30 parts by mass, bleeding thereof may occur, which is not preferred.

In the cellulose-based resin composition of the present invention, it is particularly preferred to incorporate, as a plasticizer(s), one or more of the following polyester compounds (4) to (6) (which are not cellulose esters) in an amount of 1 to 30 parts by mass with respect to 100 parts by mass of the cellulose-based resin.

(4) Polyester compound composed of a polyhydric alcohol and a polycarboxylic acid (5) Polyester compound composed of a polyhydric alcohol and a monocarboxylic acid (6) Polyester compound composed of a polycarboxylic acid and a monohydric alcohol Examples of the polyester compound (4) used in the present invention that is composed of a polyhydric alcohol and a polycarboxylic acid include, but not limited to, the below-described compounds represented by the following Formula (4):

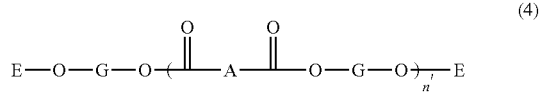

The numbers in parentheses each indicate a molar ratio in the respective mixtures. These polyester compounds may be used individually, or two or more thereof may be used in combination.

Compound No. 4-1: a polyester compound which is composed of ethylene glycol (50) and 1,2-propylene glycol (50) as the polyhydric alcohol component G, succinic acid (50) and terephthalic acid (50) as the polycarboxylic acid component A and acetyl groups as the terminals E, wherein n'=5.

Compound No. 4-2: a polyester compound which is composed of 1,2-propylene glycol as the polyhydric alcohol component G, 2,6-naphthalenedicarboxylic acid as the polycarboxylic acid component A and hydrogens as the terminals E, wherein n'=2.

Compound No. 4-3: a polyester compound which is composed of ethylene glycol as the polyhydric alcohol component G adipic acid as the polycarboxylic acid component A and acetyl groups as the terminals E, wherein n'=10.

Compound No. 4-4: a polyester compound which is composed of 1,2-propylene glycol as the polyhydric alcohol component G terephthalic acid as the polycarboxylic acid component A and toluyl groups as the terminals E, wherein n'=5.

Examples of the polyester compound (5) that is composed of a polyhydric alcohol and a monocarboxylic acid include, but not limited to, the following polyester compounds. These polyester compounds may be used individually, or two or more thereof may be used in combination.

Compound No. 5-1

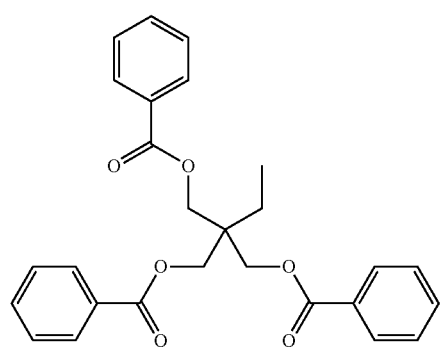

Compound No. 5-2

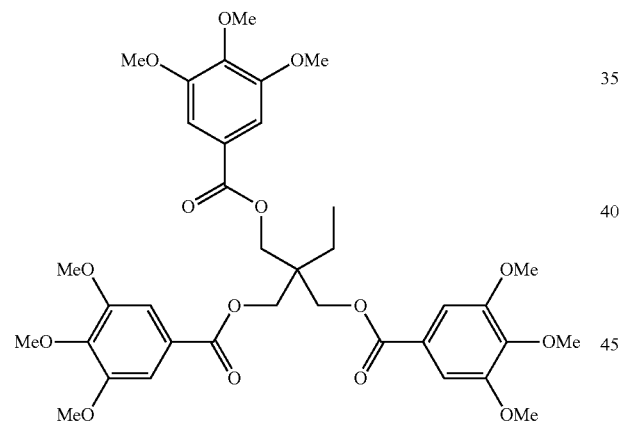

Compound No. 5-3

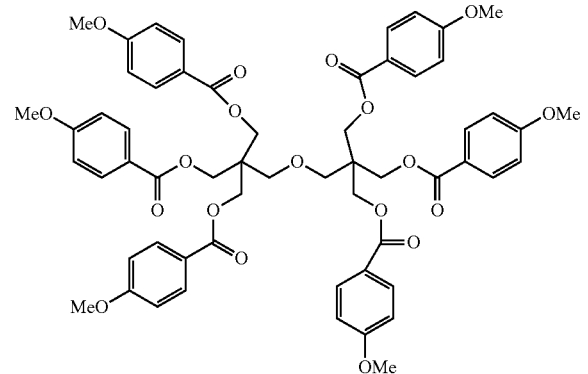

Compound No. 5-4

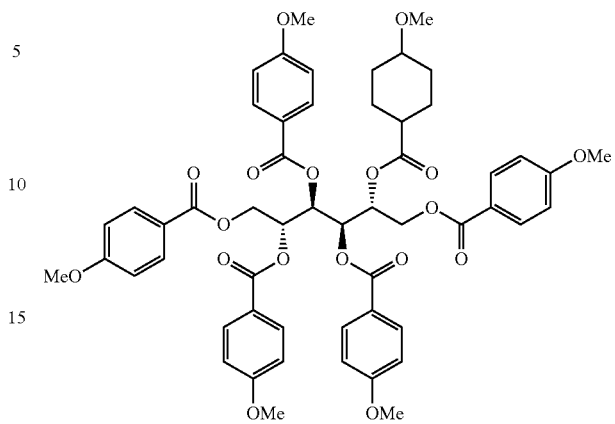

Examples of the polyester compound (6) that is composed of a polycarboxylic acid and a monohydric alcohol include, but not limited to, the following polyester compounds. These polyester compounds may be used individually, or two or more thereof may be used in combination.

Compound No. 6-1

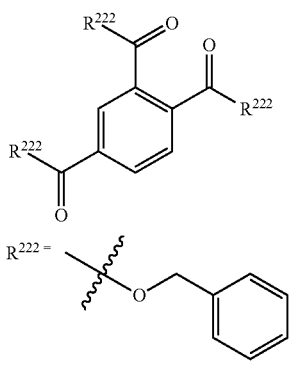

Compound No. 6-2

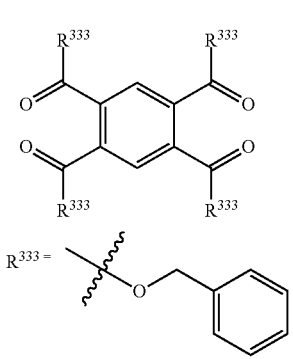

-continued

Compound No. 6-3

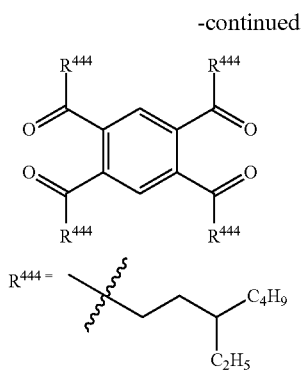

Compound No. 6-4

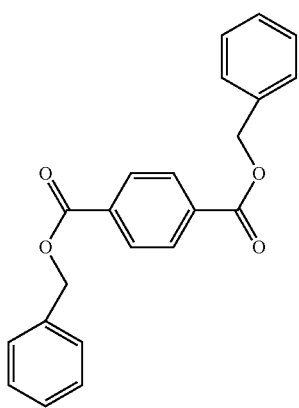

Further, in the cellulose-based resin composition of the present invention, a variety of additives, such as a phosphorous-based, phenolic or sulfur-based antioxidant, an ultraviolet absorber and a hindered amine-based light stabilizer, may also be incorporated.

Examples of the phosphorus-based antioxidant include triphenyl phosphite, tris(2,4-di-tert-butylphenyl)phosphite, tris(nonylphenyl)phosphite, tris(dinonylphenyl)phosphite, tris(mono-, di-mixed nonylphenyl)phosphite, bis(2-tert-butyl-4,6-dimethylphenyl)ethyl phosphite, diphenyl acid phosphite, 2,2'-methylene-bis(4,6-di-tert-butylphenyl)octyl phosphite, diphenyldecyl phosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentyl glycol)-1,4-cyclohexanedimethyl diphosphite, bis(2,4-di-tert-butylphenyl)pentaerythritol diphosphite, bis(2,6-di-tert-butyl-4-methylphenyl)pentaerythritol diphosphite, distearyl pentaerythritol diphosphite, phenyl-4,4'-isopropylidene diphenol-pentaerythritol diphosphite, tetra(C12-15 mixed alkyl)-4,4'-isopropylidenediphenyl phosphite, bis[2,2'-methylene-bis(4,6-diamylphenyl)]-isopropylidenediphenyl phosphite, hydrogenated-4,4'-isopropylidenediphenol polyphosphite, bis(octylphenyl)-bis[4,4'-n-butylidene-bis(2-tert-butyl-5-methylphenol)]-1,6-hexanediol diphosphite, tetratridecyl-4,4'-butylidene-bis(2-tert-butyl-5-methylphenol) diphosphite, hexa(tridecyl)-1,1,3-tris(2-methyl-5-tert-butyl-4-hydroxyphenyl)butane triphosphonite, 9,10-dihydro-9-oxa-10-phosphaphenanthrene-10-oxide, 2-butyl-2-ethylpropanediol-2,4,6-tri-tert-butylphenol monophosphite and tetrakis(2,4-di-tert-butylphenyl)biphenyl phosphonite.

Examples of the phenolic antioxidant include 2,6-di-tert-butyl-p-cresol, 2,6-diphenyl-4-octadecyloxyphenol, stearyl (3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(4,6-di-tert-butylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzy)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3,5-di-tert-butyl-4-hydroxyphenyl)propionate]methane, 2-tert-butyl-4-methyl-6-(2-acryloyloxy-3-tert-butyl-5-methylbenzyl)phenol, 3,9-bis[2-{3-(3-tert-butyl-4-hydroxy-5-methylphenyl)propanoyloxy}-1,1-dimethylethyl]-2,4,8,10-tetraoxaspiro[5.5]undecane and triethylene glycol-bis[β-(3-tert-butyl-4-hydroxy-5-methylphenyl)propionate].

Examples of the sulfur-based antioxidant include dialkyl thiodipropionates such as dilauryl thiodipropionate, dimyristyl thiodipropionate, myristylstearyl thiodipropionate and distearyl thiodipropionate; and β-alkylmercaptopropionates of polyols, such as pentaerythritol-tetra(β-dodecylmercaptopropionate).

Examples of the ultraviolet absorber include 2-hydroxybenzophenones such as 2,4-dihydroxybenzophenone, 2-hydroxy-4-methoxybenzophenone, 2-hydroxy-4-octoxybenzophenone, 2-hydroxy-4-tert-butyl-4'-(2-methacryloyloxyethoxyethoxy)benzophenone and 5,5'-methylene-bis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3-dodecyl-5-methylphenyl)benzotriazole, 2-(2-hydroxy-3-tert-butyl-5-C7 to C9 mixed alkoxycarbonylethylphenyl)triazole, 2-(2-hydroxy-3,5-dicumylphenyl)benzotriazole, 2,2'-methylene-bis(4-tert-octyl-6-benzotriazolylphenol) and polyethylene glycol ester of 2-(2-hydroxy-3-tert-butyl-5-carboxyphenyl)benzotriazole; 2-(2-hydroxyphenyl)-1,3,5-triazines such as 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2-(2-hydroxy-4-octoxyphenyl)-4,6-bis(2,4-dimethylphenyl)-1,3,5-triazine, 2-(2-hydroxy-4-acryloyloxyethoxyphenyl)-4,6-bis(2,4-dimethylphenyl)-1,3,5-triazine, 2-(2-hydroxy-4-(2-(2-ethylhexanoyloxy)ethyloxy)phenyl)-4,6-diphenyl-1,3,5-triazine, 2,4,6-tris(2-hydroxy-4-octyloxyphenyl)-1,3,5-triazine and 2,4,6-tris(2-hydroxy-3-methyl-4-(2-octanoyloxyethyl)phenyl)-1,3,5-triazine; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenylacrylate, methyl-2-cyano-3-methyl-3-(p-methoxyphenyl)acrylate and tetrakis(α-cyano-β,β-diphenylacryloyloxymethyl)methane.

Examples of the hindered amine-based light stabilizer include 2,2,6,6-tetramethyl-4-piperidyl stearate, 1,2,2,6,6-pentamethyl-4-piperidyl stearate, 2,2,6,6-tetramethyl-4-piperidylbenzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)-bis(tridecyl)-1,2,3,4-butane tetracarboxylate, bis(1,2,2,6,6-pentamethyl-4-piperidyl)-bis(tridecyl)-1,2,3,4-butane tetracarboxylate, bis(1,2,2,6,6-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/dibromoethane polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidypamino)-s-triazine-6-yl]-1,5,8,12-tetraazadodecane, 1,6,11-tris[2,4-bis(N-butyl-N-(2,2,6,6-tetramethyl-4-piperidyl)amino-s-triazine-6-ylamino]undecane, 1,6,11-tris[2,4-bis(N-butyl-N-(1,2,2,6,6-pentamethyl-4-piperidypamino-s-triazine-6-ylamino]undecane, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyl)butylcarbonyloxy}ethyl]-2,4,8,10-tetraoxaspiro[5.5]undecane and bis(1-undecyloxy-2,2,6,6-tetramethylpiperidin-4-yl)carbonate.

In addition to the above, in the present invention, as required, other additives such as a filler, a coloring agent, a cross-linking agent, an antistatic agent, a plate-out inhibitor, a surface treatment agent, a lubricant, a flame retardant, a fluorescent agent, an antifungal agent, an antibacterial agent, a metal inactivator, a mold-releasing agent, a pigment, a processing aid, an antioxidant, a light stabilizer and a foaming agent may also be incorporated.

The method of producing the cellulose-based resin composition of the present invention is not particularly restricted, and a conventionally known method can be employed. For example, a cellulose-based resin in a powder or pellet form may be mixed with the retardation-increasing agent by dry blending, or the retardation-increasing agent may be partially pre-blended and then dry-blended along with remaining components. After the dry blending, for example, the resultant may be mixed using a mill roll, a Banbury mixer, a super mixer or the like and kneaded using a uniaxial or biaxial extruder or the like. The mixing and kneading are usually performed at a temperature of about 120 to 220° C. For example, a method in which the retardation-increasing agent is added in the stage of polymerizing the cellulose-based resin or a method in which a masterbatch containing the retardation-increasing agent at a high concentration is prepared and then added to the cellulose-based resin can be employed.

Next, the film of the present invention will be described. The film of the present invention is obtained by molding the above-described cellulose-based resin composition of the present invention. A method of producing the film of the present invention will now be described; however, the present invention is not restricted thereto.

The film of the present invention can be produced by applying and drying a dope solution in which the cellulose-based resin composition of the present invention is dissolved in a solvent. As required, the dope solution may be mixed with a variety of additives. A higher concentration of the cellulose-based resin in the dope solution is more preferred because the drying load required after flow-casting of the dope solution on a support can be more reduced; however, an excessively high concentration of the cellulose-based resin increases the filtering load and thus leads to a reduction in the filtration accuracy. In order to attain satisfactory drying load and filtering load, the concentration of the cellulose-based resin is preferably 10 to 30% by mass, more preferably 15 to 25% by mass.

For the preparation of the dope solution of the present invention, a solvent may be used individually, or two or more solvents may be used in combination. From the standpoint of the production efficiency, it is preferred to use a mixture of a good solvent and a poor solvent of the cellulose-based resin. The mixing ratio of the good solvent and the poor solvent is preferably in a range of 70 to 98% by mass of the good solvent and 30 to 2% by mass of the poor solvent. With regard to the good solvent and poor solvent that are used in the present invention, a solvent which independently dissolves the cellulose-based resin to be used is defined as "good solvent", whereas a solvent which, by itself, can only swell the cellulose-based resin or is incapable of dissolving the cellulose-based resin, is defined as "poor solvent". Accordingly, the good solvent and the poor solvent are variable depending on the average acetylation degree of the cellulose-based resin. For instance, acetone is a good solvent for a cellulose-based resin having an average acetylation degree of 55%, while it is a poor solvent for a cellulose-based resin having an average acetylation degree of 60%. In this manner, the good solvent and the poor solvent are not always unambiguously determined in all cases. For those cases where cellulose triacetate, which is a cellulose-based resin preferred in the present invention, is used, organic halogen compounds such as methylene chloride and dioxolanes are exemplified as good solvents and, for those cases where cellulose acetate propionate is used, methylene chloride, acetone and methyl acetate are exemplified as good solvents. Meanwhile, in these cases, examples of the poor solvent include methanol, ethanol, n-butanol, cyclohexane and cyclohexanone.

As a method of dissolving the cellulose-based resin composition for the preparation of the above-described dope solution, any commonly used method can be employed; however, it is preferred to employ a method in which the cellulose-based resin composition is dissolved with stirring by heating it under an increased pressure in a temperature range which is not lower than the boiling point of the solvent under normal pressure and where the solvent does not boil, because such a method inhibits the generation of aggregate-form undissolved matter called gel or lump. Alternatively, a method in which the cellulose-based resin composition is mixed with a poor solvent and thereby wetted or swollen and the resultant is subsequently dissolved in a good solvent by mixing can also be preferably employed. Further, a known cold dissolution method may also be employed. In cases where a cold dissolution method is employed, methyl acetate or acetone may be used as the good solvent. The increased pressure can be applied by a method of injecting an inert gas such as nitrogen gas or by increasing the vapor pressure of the solvent by heating. It is preferred that the heating be performed externally and, for example, a jacket-type heater is preferably used because the temperature is easily controllable.

From the standpoint of the solubility of the cellulose-based resin composition, the heating temperature after the addition of a solvent is preferably in a range which is not lower than the boiling point of the solvent under normal pressure and where the solvent does not boil. When the heating temperature is excessively high, since the required pressure is increased, the productivity is reduced. The heating temperature is in a range of preferably 45 to 120° C., more preferably 60 to 110° C., still more preferably 70 to 105° C. Further, the pressure is adjusted such that the solvent does not boil at a preset temperature. Subsequently, the resulting cellulose-based resin composition solution is filtered using an appropriate filter medium such as a filter paper. As the filter medium, one having a lower absolute filtration accuracy is more preferred for removal of undesired matters and the like; however, an excessively low absolute filtration accuracy leads to a problem that clogging of the filter medium easily occurs. Thus, the absolute filtration accuracy of the filter medium is preferably 0.008 mm or less, more preferably in a range of 0.001 to 0.008 mm, still more preferably in a range of 0.003 to 0.006 mm. The material of the filter medium is not particularly restricted, and the filter medium may be made of any commonly used material. For example, filter media made of a plastic such as polypropylene or Teflon (Registered Trademark) and filter media made of a metal such as stainless steel are preferred because these filter media do not release fiber or the like.

The filtration of the dope solution can be carried out by an ordinary method; however, it is preferred to employ a method of filtering the dope solution under an increased pressure while heating it in a temperature range which is not lower than the boiling point of the solvent used under normal pressure and where the solvent does not boil, because the increase in the difference between the pressures on each side of the filter medium (hereinafter, may be referred to as "filtration pressure") is small. The filtration temperature is preferably 45 to 120° C., more preferably 45 to 70° C., still more preferably 45 to 55° C. The smaller the filtration pressure, the more preferred it is. The filtration pressure is preferably not higher than $1.6 \times 10^6$ Pa, more preferably not higher than $1.2 \times 10^6$ Pa, still more preferably not higher than $1.0 \times 10^6$ Pa.

The substrate used in the flow-casting (casting) step is preferably one made of endless belt-form or drum-form mirror-finished stainless steel. It is preferred that the temperature of the substrate in the casting step be 0° C. to lower than the boiling point of the solvent. A higher temperature allows a faster drying rate; however, an excessively high temperature may cause foaming and deteriorate the flatness of the substrate. The substrate temperature is preferably 0 to 50° C., more preferably 5 to 30° C. The method of controlling the substrate temperature is not particularly restricted and, for example, a method of blowing warm air or cold air onto the substrate or a method of bringing a warm-water vat into contact with the substrate may be employed. Therebetween, the method using a warm-water vat is preferred because the heat is transferred more efficiently and the time required for bringing the substrate to a constant temperature is shorter. In cases where warm air is used, it is necessary to use an air having a temperature higher than the target temperature. In order to allow the cellulose-based resin film to exhibit good flatness, the amount of residual solvent at the time of removing the film from the substrate is preferably 10 to 120% by mass, more preferably 20 to 40% by mass or 60 to 120% by mass, particularly preferably 20 to 30% by mass or 70 to 115% by mass.

In the present invention, the amount of residual solvent is defined by the following formula:

Amount of residual solvent=[(Film mass before heat treatment−Film mass after heat treatment)/(Film mass after heat treatment)]×100(%)

Here, the "heat treatment" performed for the measurement of the amount of residual solvent refers to heating of the film at 115° C. for 1 hour. Further, in the step of drying the cellulose-based resin film, the film removed from the substrate is further dried such that the amount of residual solvent becomes preferably 3% by mass or less, more preferably 0.5% by mass or less. In the film drying step, generally, a method in which the film is dried while being transferred by a roll suspension system or tenter system is employed.

It is preferred that the film be subjected to width maintenance or stretching by a tenter system immediately after being removed from the substrate while a large amount of solvent still remains therein, because this exerts superior dimensional stability-improving effect. The means for drying the film is not particularly restricted, and the film can be dried using a hot air, infrared radiation, heating roll, microwave or the like. From the standpoint of simplicity, it is preferred that the drying be performed using hot air. In this case, it is preferred that the drying temperature be increased stepwise in a range of 40 to 150° C. and, in order to improve the dimensional stability, it is more preferred that the drying be performed at a temperature of 50 to 140° C.

The smaller the thickness of the cellulose-based resin film as a stretched optical compensation film, the more preferred it is, because this makes it easier to reduce the thickness of a liquid crystal display. However, an excessively thin cellulose-based resin film results in an increased moisture permeability, which leads to insufficient tearing strength and the like. In order to attain both reduction of the thickness of the liquid crystal display and sufficient tearing strength, the thickness of the cellulose-based resin film is preferably 10 to 150 µm, more preferably 20 to 100 µm.

EXAMPLES

The present invention will now be described in more detail by way of examples thereof. However, the present invention is not restricted to the following examples by any means. It is noted here that the unit of the amounts shown in Tables below is parts by mass.

Examples 1 to 53 and Comparative Examples 1 to 15

In a mixed solvent composed of 1,000 parts by mass of methylene chloride and 100 parts by mass of methyl alcohol, 100 parts by mass of cellulose triacetate (acetylation degree: 61.5%, polymerization degree: 260) and the respective additives shown in Tables 1 to 10 below in the amount (parts by mass) shown in the Tables 1 to 10 were uniformly dissolved with stirring, thereby preparing various dope solutions. Then, the thus obtained dope solutions were each flow-casted on a glass plate at a thickness of about 80 µm and dried at room temperature for 16 hours, followed by 1-hour drying at 50° C. and 1-hour drying at 120° C., thereby obtaining various evaluation films. These films all had a thickness of about 80 µm.

<Method of Measuring Retardation>

For the thus obtained films, using an automatic birefringence meter RETS-100 (manufactured by Otsuka Electronics Co., Ltd.), the thickness-direction retardation (Rth) at a wavelength of 590 nm was determined under an environment having a temperature of 25° C. and a relative humidity of 60% in accordance with the following equation.

$Rth = \{(nx+ny)/2 - nz\} \times d$

[wherein, nx represents the refractive index in the direction with the highest film in-plane refractive index; ny represents the film in-plane refractive index in the direction perpendicular to the direction of nx; nz represents the refractive index in the film thickness direction; and d represents the film thickness (nm)]

<Method of Evaluating Bleed Resistance>

The thus obtained films were each cut into a size of 30 mm×40 mm and left to stand for 7 days under the condition of a temperature of 40° C. and a relative humidity of 80%. Then, the surface of each film was visually observed, and the presence or absence of bleeding was verified based on the following evaluation criteria.

○: No bleeding was observed, and the film was transparent and uniform.

x: Bleeding was observed, or the film was opaque or not uniform.

The evaluation results are shown in Tables 1 to 10 below.

<Retardation Increase Rate>

Using a formulation with no addition of a retardation-increasing agent (Comparative Example 1) as a reference, the rate (%) of increase in the retardation (Rth) value was determined for the respective formulations shown in Tables 1 to 10 below.

TABLE 1

|  | Example 1 | Example 2 | Example 3 | Example 4 | Example 5 | Example 6 | Example 7 | Example 8 |
|---|---|---|---|---|---|---|---|---|
| Compound No. 1-1 | 1 | 2 | — | — | — | — | — | — |
| Compound No. 1-2 | — | — | 1 | — | — | — | — | — |
| Compound No. 1-22 | — | — | — | 1 | — | — | — | — |
| Compound No. 3-1 | — | — | — | — | 1 | — | — | — |
| Compound No. 3-2 | — | — | — | — | — | 1 | 2 | — |
| Compound No. 3-4 | — | — | — | — | — | — | — | 1 |
| Bleed resistance | ○ | ○ | ○ | ○ | ○ | ○ | ○ | ○ |
| Retardation Rth (nm) | 71 | 112 | 63 | 76 | 55 | 56 | 96 | 57 |
| Retardation increase rate (%) | 77.5 | 180 | 57.5 | 90.0 | 37.5 | 40.0 | 140 | 42.5 |

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| —*1 | — | — | — | — | — | — | — |
| TPP*2 | — | 1 | — | — | — | — | — |
| Comparative Compound*3 | — | — | 1 | — | — | — | — |
| Comparative Compound*4 | — | — | — | 1 | — | — | — |
| Comparative Compound*5 | — | — | — | — | 1 | — | — |
| Comparative Compound*6 | — | — | — | — | — | 1 | — |
| Comparative Compound*7 | — | — | — | — | — | — | 1 |
| Bleed resistance | — | ○ | ○ | ○ | ○ | ○ | ○ |
| Retardation Rth (nm) | 40 | 40 | 44 | 42 | 42 | 40 | 45 |
| Retardation increase rate (%) | 0.0 | 0.0 | 10.0 | 5.0 | 5.0 | 0.0 | 12.5 |

*1 with no addition of retardation-increasing agent
*2 triphenyl phosphate
*3 triazine-based retardation-increasing agent TABLE 2-continued
|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
*4
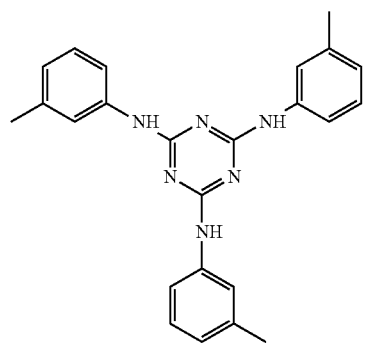 [SMILES: Cc1cccc(Nc2nc(Nc3cccc(C)c3)nc(Nc3cccc(C)c3)n2)c1]
*5
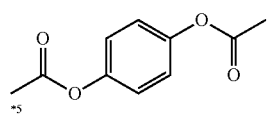
*6
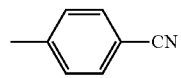
*7
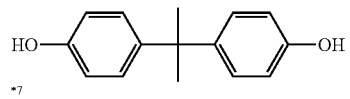
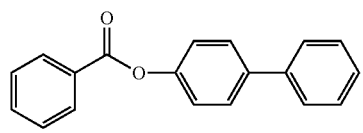 [SMILES: O=C(Oc1ccc(-c2ccccc2)cc1)c1ccccc1]
TABLE 3
|  | Example 9 | Example 10 | Example 11 | Example 12 | Example 13 | Example 14 | Example 15 | Example 16 | Example 17 |
|---|---|---|---|---|---|---|---|---|---|
| Compound No. 1-1 | 5 | — | — | — | — | — | — | — | — |
| Compound No. 1-2 | — | 5 | — | — | — | — | — | — | — |
| Compound No. 1-3 | — | — | 5 | — | — | — | — | — | — |
| Compound No. 1-4 | — | — | — | 5 | — | — | — | — | — |
| Compound No. 1-5 | — | — | — | — | 5 | — | — | — | — |

TABLE 3-continued

|  | Example 9 | Example 10 | Example 11 | Example 12 | Example 13 | Example 14 | Example 15 | Example 16 | Example 17 |
|---|---|---|---|---|---|---|---|---|---|
| Compound No. 1-6 | — | — | — | — | — | 5 | — | — | — |
| Compound No. 1-7 | — | — | — | — | — | — | 5 | — | — |
| Compound No. 1-8 | — | — | — | — | — | — | — | 5 | — |
| Compound No. 1-10 | — | — | — | — | — | — | — | — | 5 |
| Bleed resistance | ○ | ○ | ○ | ○ | ○ | ○ | ○ | ○ | ○ |
| Retardation Rth (nm) | 154 | 156 | 126 | 162 | 136 | 113 | 93 | 180 | 109 |
| Retardation increase rate (%) | 285 | 290 | 215 | 305 | 240 | 183 | 133 | 350 | 173 |

TABLE 4

|  | Example 18 | Example 19 | Example 20 | Example 21 | Example 22 | Example 23 | Example 24 |
|---|---|---|---|---|---|---|---|
| Compound No. 1-12 | 5 | — | — | — | — | — | — |
| Compound No. 1-13 | — | 5 | — | — | — | — | — |
| Compound No. 1-15 | — | — | 5 | — | — | — | — |
| Compound No. 2-1 | — | — | — | 5 | — | — | — |
| Compound No. 3-1 | — | — | — | — | 5 | — | — |
| Compound No. 3-2 | — | — | — | — | — | 5 | — |
| Compound No. 3-3 | — | — | — | — | — | — | 5 |
| Bleed resistance | ○ | ○ | ○ | ○ | ○ | ○ | ○ |
| Retardation Rth (nm) | 143 | 113 | 131 | 116 | 107 | 130 | 94 |
| Retardation increase rate (%) | 258 | 183 | 228 | 190 | 168 | 225 | 135 |

TABLE 5

|  | Example 25 | Example 26 | Example 27 | Example 28 | Example 29 | Example 30 |
|---|---|---|---|---|---|---|
| Compound No. 1-20 | 5 | — | — | — | — | — |
| Compound No. 1-21 | — | 5 | — | — | — | — |
| Compound No. 1-22 | — | — | 5 | — | — | — |
| Compound No. 3-4 | — | — | — | 5 | — | — |
| Compound No. 3-5 | — | — | — | — | 5 | — |
| Compound No. 3-7 | — | — | — | — | — | 5 |
| Bleed resistance | ○ | ○ | ○ | ○ | ○ | ○ |
| Retardation Rth (nm) | 155 | 120 | 182 | 103 | 98 | 109 |
| Retardation increase rate (%) | 288 | 200 | 355 | 158 | 145 | 173 |

TABLE 6

|  | Comparative Example 8 | Comparative Example 9 | Comparative Example 10 | Comparative Example 11 | Comparative Example 12 |
|---|---|---|---|---|---|
| Comparative Compound[*3] | 5 | — | — | — | — |
| Comparative Compound[*4] | — | 5 | — | — | — |
| Comparative Compound[*5] | — | — | 5 | — | — |
| Comparative Compound[*6] | — | — | — | 5 | — |
| Comparative Compound[*7] | — | — | — | — | 5 |
| Bleed resistance | x | ○ | ○ | ○ | x |
| Retardation Rth (nm) | not measurable | 55 | 65 | 40 | not measurable |
| Retardation increase rate (%) | — | 37.5 | 62.5 | 0.0 | — |

TABLE 7

|  | Example 31 | Example 32 | Example 33 | Example 34 | Example 35 | Example 36 | Example 37 | Example 38 | Example 39 |
|---|---|---|---|---|---|---|---|---|---|
| Compound No. 1-1 | — | — | 5 | 5 | — | — | — | — | — |
| Compound No. 1-4 | 10 | — | — | — | — | — | — | — | — |
| Compound No. 1-10 | — | 10 | — | — | — | — | — | — | — |
| Compound No. 1-12 | — | — | — | — | — | — | 10 | — | — |
| Compound No. 1-21 | — | — | — | — | — | — | — | 10 | — |
| Compound No. 2-1 | — | — | — | — | 5 | 5 | — | — | — |
| Compound No. 4-2 | — | — | 5 | — | 5 | — | — | — | — |
| Compound No. 5-2 | — | — | — | 5 | — | 5 | — | — | — |
| Compound No. 3-1 | — | — | — | — | — | — | — | — | 10 |
| Bleed resistance | ○ | ○ | ○ | ○ | ○ | ○ | ○ | ○ | ○ |
| Retardation Rth (nm) | 295 | 148 | 199 | 171 | 179 | 133 | 229 | 150 | 161 |
| Retardation increase rate (%) | 638 | 270 | 398 | 328 | 348 | 233 | 473 | 275 | 303 |

TABLE 8

|  | Example 40 | Example 41 | Example 42 | Example 43 | Example 44 | Example 45 | Example 46 | Example 47 |
|---|---|---|---|---|---|---|---|---|
| Compound No. 3-2 | 10 | 5 | 5 | — | — | — | — | — |
| Compound No. 3-4 | — | — | — | 10 | — | — | — | — |
| Compound No. 3-5 | — | — | — | — | 10 | — | — | — |
| Compound No. 3-7 | — | — | — | — | — | 10 | — | — |
| Compound No. 3-8 | — | — | — | — | — | — | 10 | — |
| Compound No. 1-13 | — | — | — | — | — | — | — | 10 |
| Compound No. 4-2 | — | 5 | — | — | — | — | — | — |
| Compound No. 5-2 | — | — | 5 | — | — | — | — | — |
| Bleed resistance | ○ | ○ | ○ | ○ | ○ | ○ | ○ | ○ |
| Retardation Rth (nm) | 166 | 175 | 135 | 122 | 137 | 150 | 121 | 167 |
| Retardation increase rate (%) | 315 | 338 | 238 | 205 | 243 | 275 | 203 | 318 |

TABLE 9

|  | Comparative Example 13 | Comparative Example 14 | Comparative Example 15 |
|---|---|---|---|
| TPP*2 | 10 | — | — |
| Comparative Compound*5 | — | 10 | — |
| Comparative Compound*6 | — | — | 10 |
| Bleed resistance | ○ | x | x |
| Retardation Rth (nm) | 49 | not measurable | not measurable |
| Retardation increase rate (%) | 22.5 | — | — |

TABLE 10

|  | Example 48 | Example 49 | Example 50 | Example 51 | Example 52 | Example 53 |
|---|---|---|---|---|---|---|
| Compound No. 1-6 | 15 | — | — | — | — | — |
| Compound No. 1-7 | — | 15 | — | — | — | — |
| Compound No. 3-1 | — | — | 15 | — | — | — |
| Compound No. 3-4 | — | — | — | 15 | — | — |
| Compound No. 3-7 | — | — | — | — | 15 | — |
| Compound No. 3-6 | — | — | — | — | — | 20 |
| Bleed resistance | ○ | ○ | ○ | ○ | ○ | ○ |
| Retardation Rth (nm) | 224 | 139 | 202 | 153 | 178 | 106 |
| Retardation increase rate (%) | 460 | 248 | 405 | 283 | 345 | 165 |

As clearly seen from Tables 1 to 10 above, in those cases where the retardation-increasing agent of the present invention was used, a high retardation (Rth) was attained regardless of the added amount thereof. In addition, it is apparent that the retardation-increasing agent of the present invention (Examples 1 to 53) exhibited an extremely high retardation-increasing rate (%) as compared to the commonly-used retardation-increasing agents of Comparative Examples 1 to 7, 9 to 11 and 13 and Comparative Compounds.

Moreover, the retardation-increasing agent of the present invention exhibited excellent bleed resistance even when it was added in an increased amount; however, an increase in the amount of the commonly-used retardation-increasing agent or Comparative Compound (Comparative Examples 8, 12, 14 and 15) caused bleeding or resulted in an opaque or non-uniform film, so that the retardation could not even measured. Furthermore, as clearly seen from Examples 33 to 36, 41 and 42, the use of the retardation-increasing agent of the present invention in combination of a polyester-based plasticizer also resulted in excellent optical properties without impairing retardation.

The invention claimed is:

1. A fatty acid ester of cellulose resin composition comprising

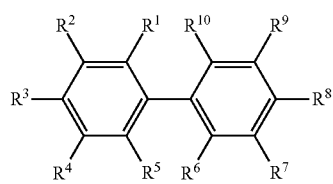

(1)

a retardation increasing agent in an amount of 0.1 to 30 parts by mass with respect to 100 parts by mass of a fatty acid ester of cellulose resin;

wherein said retardation increasing agent is represented by the following Formula (3):

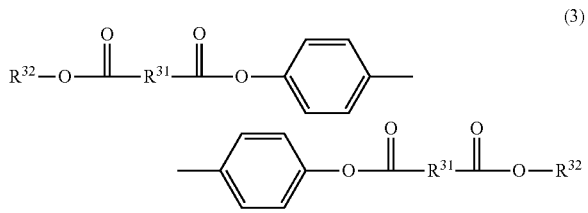

(3)

wherein, $R^{31}$ represents a substituted or unsubstituted alkylene group having 1 to 10 carbon atoms or a substituted or unsubstituted cycloalkylene group having 4 to 10 carbon atoms; $R^{32}$ represents a substituted or unsubstituted alkyl group having 1 to 10 carbon atoms or a substituted or unsubstituted cycloalkyl group having 4 to 10 carbon atoms, which alkyl group is optionally interrupted by one or plural oxygen atoms or carbonyl groups.

2. The fatty acid ester of cellulose resin composition according to claim 1, further comprising a plasticizer in an amount of 1 to 30 parts by mass with respect to 100 parts by mass of said fatty acid ester of cellulose resin.

3. The fatty acid ester of cellulose resin composition according to claim 1, wherein said fatty acid ester of cellulose resin is cellulose acylate.

4. A film obtained by molding the fatty acid ester of cellulose resin composition according to claim 1.

* * * * *